United States Patent
Alcantara et al.

(10) Patent No.: US 8,046,120 B2
(45) Date of Patent: Oct. 25, 2011

(54) SYSTEM AND METHOD FOR AUTOMATICALLY CONTROLLING TAKE-OFF THRUST IN AN AIRCRAFT

(75) Inventors: Roy S. Alcantara, Seattle, WA (US); Bradley J. Fischer, Sammamish, WA (US); Raymond P. Craig, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/909,360

(22) Filed: Oct. 21, 2010

(65) Prior Publication Data

US 2011/0093141 A1 Apr. 21, 2011

Related U.S. Application Data

(63) Continuation of application No. 11/743,408, filed on May 2, 2007, now Pat. No. 7,930,075.

(51) Int. Cl.
*G06G 7/70* (2006.01)

(52) U.S. Cl. ............................ 701/15; 701/16; 340/959

(58) Field of Classification Search .................. 701/15, 701/16; 340/959
See application file for complete search history.

(56) References Cited

U.S. PATENT DOCUMENTS

| | | |
|---|---|---|
| 5,270,931 A | 12/1993 | Appleford |
| 5,893,040 A | 4/1999 | Gunn et al. |
| 6,880,784 B1 | 4/2005 | Wilkinson et al. |
| 6,886,786 B1 | 5/2005 | Huynh |
| 7,584,028 B2 | 9/2009 | Burnside |
| 2007/0124034 A1 | 5/2007 | Pitard et al. |
| 2007/0288130 A1 | 12/2007 | Lemoult et al. |

*Primary Examiner* — Mark Hellner
(74) *Attorney, Agent, or Firm* — Harness, Dickey & Pierce, P.L.C.

(57) ABSTRACT

A method for automatically selecting a take-off thrust setting for an engine of a jet powered mobile platform that has a flight management computer (FMC) that makes use of a configuration code. The configuration code is provided from a first set of information relating to operational parameters of the mobile platform. A database in communication with the FMC stores information pertaining to different locations from which a take-off operation can be performed. The FMC accesses the configuration code and the database to determine a take-off thrust setting to apply during the take-off operation at a specified one of the locations. The FMC also determines if an operator has overridden an automatic selection of the take-off thrust.

21 Claims, 6 Drawing Sheets

SYSTEM AND METHOD FOR AUTOMATICALLY CONTROLLING TAKE-OFF THRUST IN AN AIRCRAFT

CROSS-REFERENCE TO RELATED APPLICATIONS

This application is a continuation of U.S. patent application Ser. No. 11/743,408 filed on May 2, 2007. The entire disclosure of the above application is incorporated herein by reference.

FIELD

The present disclosure relates to systems and methods for controlling take-off thrust for an engine of a mobile platform, and more particularly for a system and method that utilizes a flight management computer on board an aircraft that accesses stored information relating to configuration and performance variables for the aircraft and its engine(s), and the specific airport and runway that is taking off from, and automatically selects the appropriate take-off thrust to use during a take-off phase of flight.

BACKGROUND

The statements in this section merely provide background information related to the present disclosure and may not constitute prior art.

In many commercial aircraft environments, a pilot is responsible for manually selecting a take-off thrust for the jet engines of the aircraft being flown. Typically a co-pilot makes a cross check to ensure that the appropriate take-off thrust level has been selected. As will be appreciated, with the numerous checks and pre-flight take-off procedures that are required with a commercial jet aircraft, the selection of take-off thrust adds further responsibility for the pilot and co-pilot.

In some instances, the selection of take-off thrust is made by uploading commands via an ACARS (Aircraft Communication Addressing and Reporting System) wireless data link. The ACARS data link may be controlled from a control station operated by an entity such as an airline company. However, this introduces additional cost because of the equipment and manpower associated with operating the ACARS, and the bandwidth required to send the needed take-off thrust selection commands.

SUMMARY

In one aspect the present disclosure relates to a method for automatically selecting a take-off thrust setting for an engine of a jet powered mobile platform, where the jet powered mobile platform includes a flight management computer that makes use of a configuration code, and where the configuration code is provided from a first set of information relating to operational parameters of the jet powered mobile platform. The method may comprise using a database in communication with the flight management computer to store information pertaining to different locations from which the jet powered mobile platform may perform a take-off operation. The flight management computer may be used to access the configuration code and the database to determine a take-off thrust setting that needs to be applied during the take-off operation at a specified one of said locations. The flight management computer may also be used to determine if an operator of the jet powered mobile platform has input a command to the flight management computer to override automatic selection of the take-off thrust.

In another aspect the present disclosure relates to a method for determining a take-off thrust for an engine of a jet powered aircraft. The method may comprise providing a first database including a plurality of aircraft configuration codes, with each aircraft configuration code representing a plurality of operational parameters of the aircraft. The first database may be stored on a component of the aircraft. A second database may be used that has a plurality of lookup tables, with each lookup table being associated with at least one aircraft configuration code and including a plurality of different runways from which the aircraft may perform a take-off operation, and a take-off thrust to be used at each said runway. A specific aircraft configuration code may be used to retrieve a specific one of the lookup tables within the second database to obtain an engine take-off thrust to be used at a particular one of the runways during a take-off operation.

In another aspect the present disclosure relates to a system for automatically selecting a take-off thrust for an engine of a jet powered aircraft, where the aircraft has a flight management computer and a memory in communication with the flight management computer. The system may comprise an airport/runway look-up table database stored in the memory. The look-up table database may include a plurality of lookup tables that are each associated with at least one aircraft configuration code. Each aircraft configuration code may represent a specific collection of operational parameters of a specific aircraft. Each lookup table may include a take-off thrust code representing a specific engine thrust setting to be used for a take-off operation at a specific runway. The flight management computer may be adapted to use the aircraft configuration code to select the look-up table, to thus obtain a specific engine take-off thrust to be used in a take-off procedure when the aircraft takes off from the specific runway.

In another aspect the present disclosure relates to a method for determining a take-off thrust for an engine of a jet powered aircraft. The method may comprise storing a plurality of aircraft configuration codes, with each aircraft configuration code representing a plurality of operational parameters of the aircraft. A plurality of lookup tables may be stored, with each lookup table being associated with at least one aircraft configuration code, and may further include a plurality of different runways from which the aircraft may perform a take-off operation, and a take-off thrust setting to be used at each runway. A specific aircraft configuration code may be selected to retrieve a specific one of the lookup tables to obtain an engine take-off thrust setting to be used at a particular one of the runways during a take-off operation. An aircraft communication and reporting subsystem (ACARS), remote from the jet powered aircraft, may be used to wirelessly provide the engine take-off trust setting to the jet powered aircraft.

In still another aspect the present disclosure relates to a system for determining a take-off thrust for an engine of a jet powered aircraft. The system may comprise a plurality of aircraft configuration codes, with each aircraft configuration code representing a plurality of operational parameters of the aircraft. A plurality of lookup tables may be used that each is associated with at least one aircraft configuration code. Each lookup table may include a plurality of different runways from which the aircraft may perform a take-off operation, and a take-off thrust setting to be used at each runway. An aircraft communication and reporting subsystem (ACARS) may be included for wirelessly providing a selected take-off thrust setting obtained from a selected one of the lookup tables to the jet powered aircraft.

The present disclosure is directed to a system and method for enabling a flight management computer of a mobile platform, in one example a jet powered aircraft, to automatically select the appropriate take-off thrust for a take-off phase of flight.

In one exemplary implementation a method is provided by which an aircraft configuration code is accessed by a flight management computer (FMC) of an aircraft. The configuration code represents a code associated with a first set of information directed to the model of aircraft and the various operational features of the aircraft including the number and type of engines of the aircraft. At least one lookup table operably associated with the FMC and with the configuration code is also accessed by the FMC. The lookup table includes at least one airport, and more preferably a plurality of airports at which the aircraft may operate. Still more preferably, the lookup table may include a listing of the runways at each airport.

The lookup table also includes a specific take-off thrust that the aircraft is to use when taking off from a specific airport, or a specific runway of a specific airport. The lookup table thus enables the FMC to automatically obtain the proper take-off thrust setting for a specific runway at a specific airport, based on the specific configuration code associated with the aircraft. The method also enables a default take-off thrust setting to be used if an airport that the aircraft is operating at is not included within the information provided in the lookup table.

In exemplary embodiments, the configuration code of the aircraft may take into account specific configuration parameters of the aircraft including, but not limited to: type and number of engines; full thrust rating of each engine; an engine bump thrust rating, if applicable; whether the engine is of a single or dual annular combustor variety; whether winglets are installed on the aircraft; whether brakes are installed on the aircraft; and whether the aircraft includes no tail skid, a one-position tailskid or a two-position tailskid. Virtually any information concerning the aircraft may be factored in to the configuration code. The information from the configuration code is used in constructing the lookup table. The lookup table provides a specific take-off thrust that is to be used for specific runways at specific airports, for a specific aircraft configuration code.

In one implementation the system and method further enables the pilot or co-pilot to override the automatic take-off thrust selected by the FMC and to manually select a different take-off thrust. The FMC take-off thrust selection can also be overridden by a take-off thrust command received via a wireless ACARS data link.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
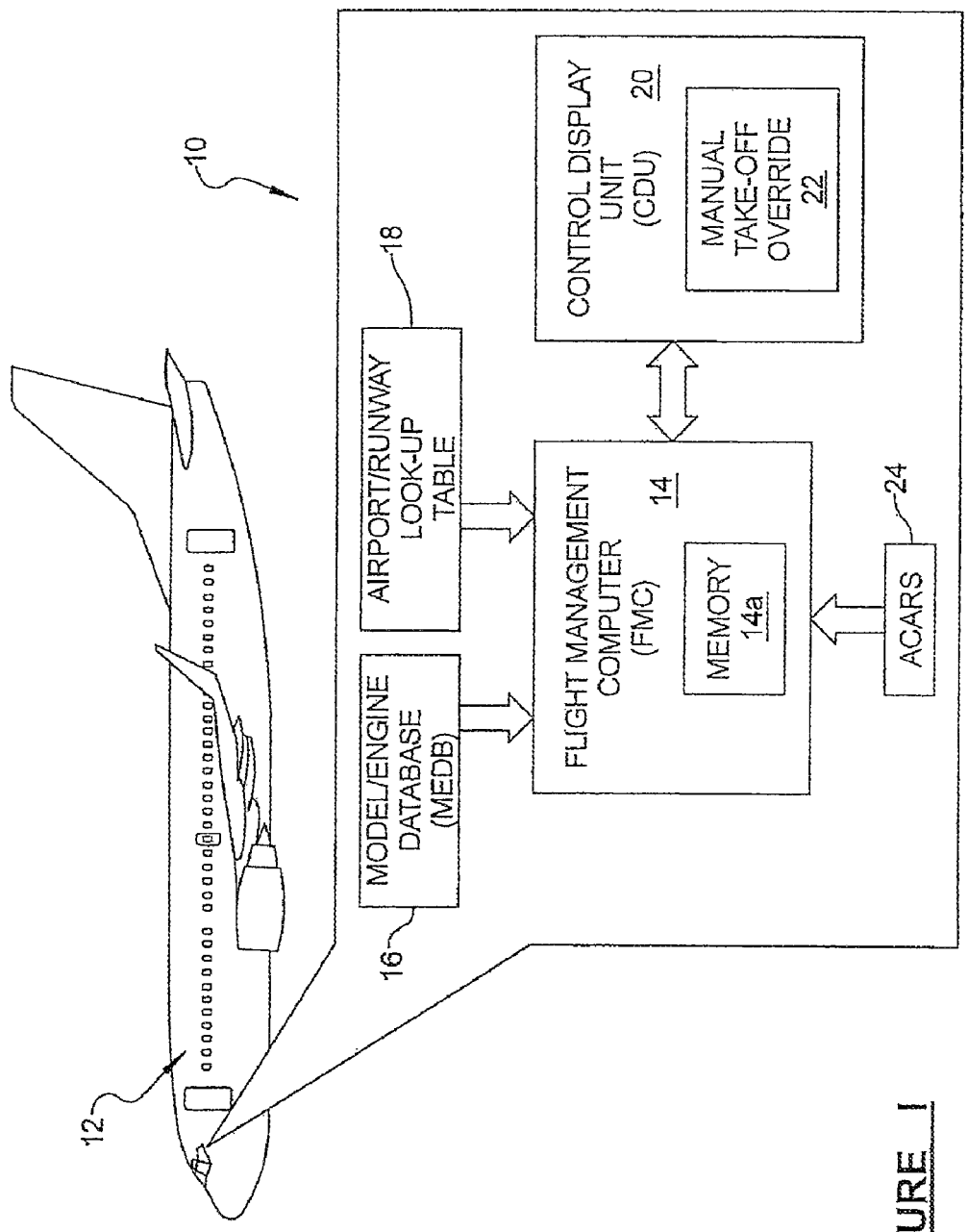
FIG. 1 is a simplified block diagram illustrating one exemplary implementation of the system and method of the present disclosure used with a commercial jet aircraft.

Referring to FIG. 1, there is shown a system 10 in accordance with one exemplary embodiment of the present disclosure. The system 10 in this example is employed on a commercial passenger jet aircraft 12, although it will be appreciated that the system 10 could be implemented on other types of airborne mobile platforms, such as jet cargo transport aircraft or possibly even on various types of military aircraft. Thus, the system 10 should not be viewed as being limited in applicability to only one specific type of aircraft.

The system 10 includes a flight management computer (FMC) 14 that is carried on the aircraft 12. The FMC 14 includes an operably associated non-volatile memory 14a and is in communication with a Model/Engine database (MEDB) 16 and an Airport/Runway lookup table database 18. A conventional Control Display Unit (CDU) 20 is in communication with the FMC 14 for displaying various information to the pilot and co-pilot. Optionally but preferably, the CDU 20 also includes a take-off thrust selection manual override selection 22 for allowing the pilot to manually override a take-off thrust selection being made by the system 10. Optionally but preferably the system 10 also includes an Aircraft Communication and Reporting System (ACARS) subsystem 24 for enabling take-off thrust selection to be made remotely by wireless commands transmitted from a remote control center (not shown), which could be operated by the airline company operating the aircraft 12.

The MEDB 16 forms a detailed database that includes configuration information for a plurality of different aircraft. However, it within the scope of the present disclosure that rather than including a database of different aircraft configuration codes such as the MEDB 16, a specific aircraft configuration code could simply be programmed into software associated with the FMC 14. Virtually any system or methodology for supplying a designation or code that identifies the aircraft model and its operational parameters may be used.

If the MEDB 16 is employed, then it may include a plurality of different aircraft "configuration codes", with each specific aircraft configuration code pertaining to a specific aircraft that reflects the model of the aircraft, specifics on its engines, and other features of the aircraft. The MEDB 16 may include a large plurality of aircraft configuration codes, possibly up to several hundred or more such different configuration codes.

A specific aircraft configuration code may include information pertaining to the aircraft model number (e.g., Boeing 737-800); type and number of engines (typically two or four engines); full thrust rating of each engine (e.g., 26,000 lbs, 24,000 lbs, etc.); an engine bump thrust rating, if applicable; whether the engine is of a single or dual annular combustor variety; whether winglets are installed on the aircraft; whether brakes are installed on the aircraft; and whether the aircraft includes no tail skid, a one-position tailskid or a two-position tailskid.

Figure 2:
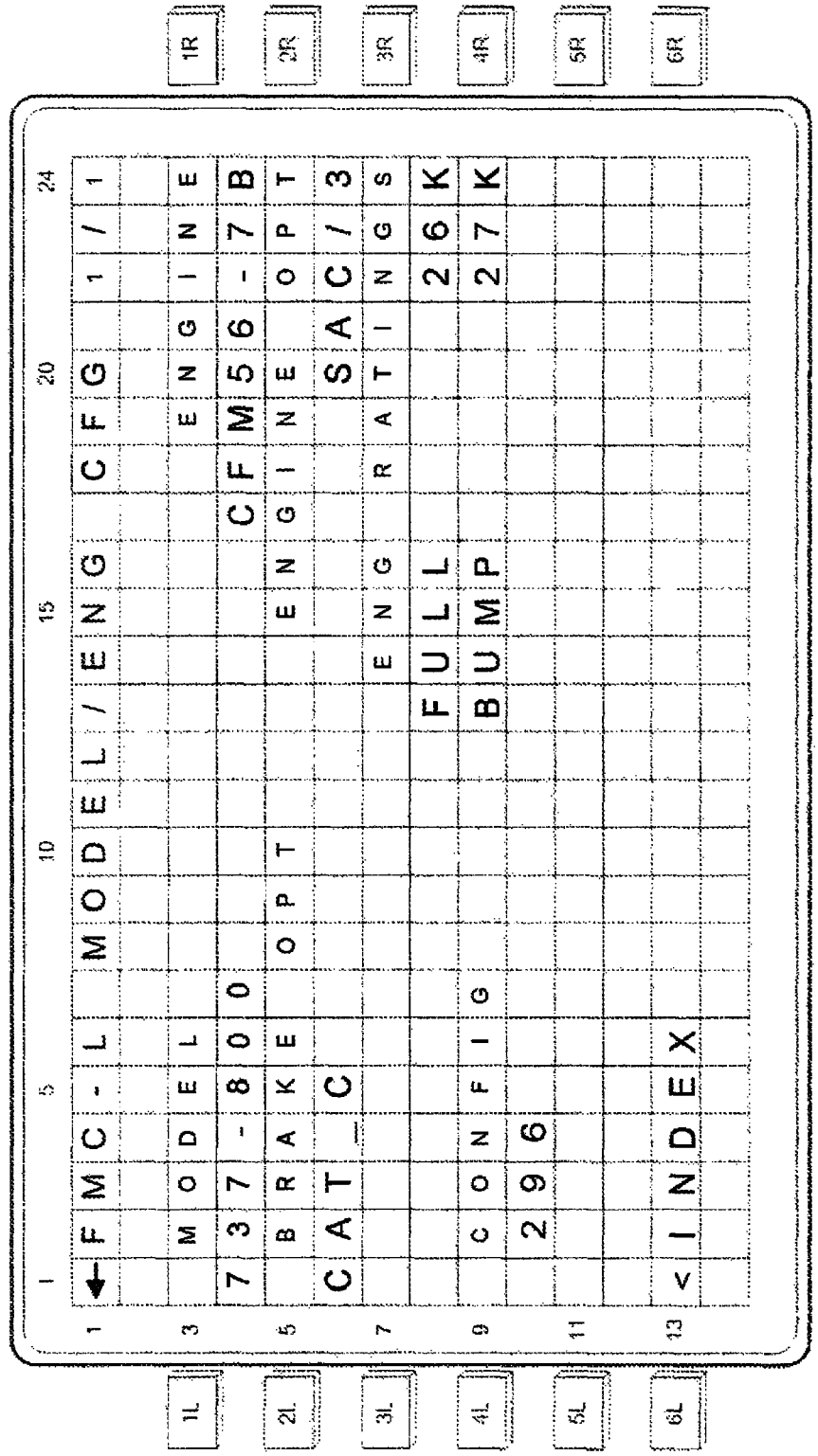
FIG. 2 is an exemplary illustration of a screen of the Control Display Unit (CDU) that provides configuration information for the aircraft that is employing the present system and method.

FIG. 2 illustrates the CDU 20 displaying one exemplary model/engine configuration that is associated with the aircraft configuration code number "296". In this example the aircraft is a Boeing 737-800 series aircraft; the engines carried by the aircraft are CFM56-7B turbofan engines each having a full thrust rating of 26,000 lbs and a bump thrust rating of 27,000 lbs. The terminology "BRAKE OPT" lists the brake option for the aircraft 12 as being "CAT_C" (i.e., category A), which represents a Boeing performance rating for the brakes of the aircraft 12.

The Airport/Runway lookup table database 18 forms a detailed database that may include as few, possibly one or two, or as many as several hundred or more, separate lookup tables as needed or desired. Each specific lookup table in the Airport/Runway lookup table database 18 may list a plurality of airports that the aircraft 12 may operate at, and may also list the runways at each airport. Each lookup table also provides a specific take-off thrust to be used at a specific airport, or a specific runway of a specific airport. The designated take-off thrust may be represented by a code number. For example, the code number "0" may be used to designate full take-off thrust, the number "1" to designate a first fixed derate take-off thrust, the number "2" to designate a second, fixed derate take-off thrust, and "B" to designate a take-off bump thrust. For example, a configuration code of "296" may have a specific lookup table in the Airport/Runway lookup table database 18 that the FMC 14 accesses for determining the take-off thrust that should be selected. The FMC 14 uses the specific, retrieved lookup table for configuration code 296 and identifies the airport that the aircraft 12 is at, and provides the appropriate take-off thrust for the specific runway that the aircraft will be using.

The Airport/Runway lookup table database 18 may be loaded into the non-volatile memory 14a of the FMC 14, for example via a magnetic storage medium such as a diskette. Alternatively, the Airport/Runway lookup table database 18 may be loaded into the FMC 14 via an interface cable from a laptop computer carried onto the aircraft 10. It is also possible that the Airport/Runway lookup table database 18 could be loaded remotely via a wireless data link. The MEDB 16 may be stored in a random access memory, a read-only memory or by other suitable means of non-volatile memory storage that permits ready access by a controller (not shown) of the FMC 14.

Figure 3:
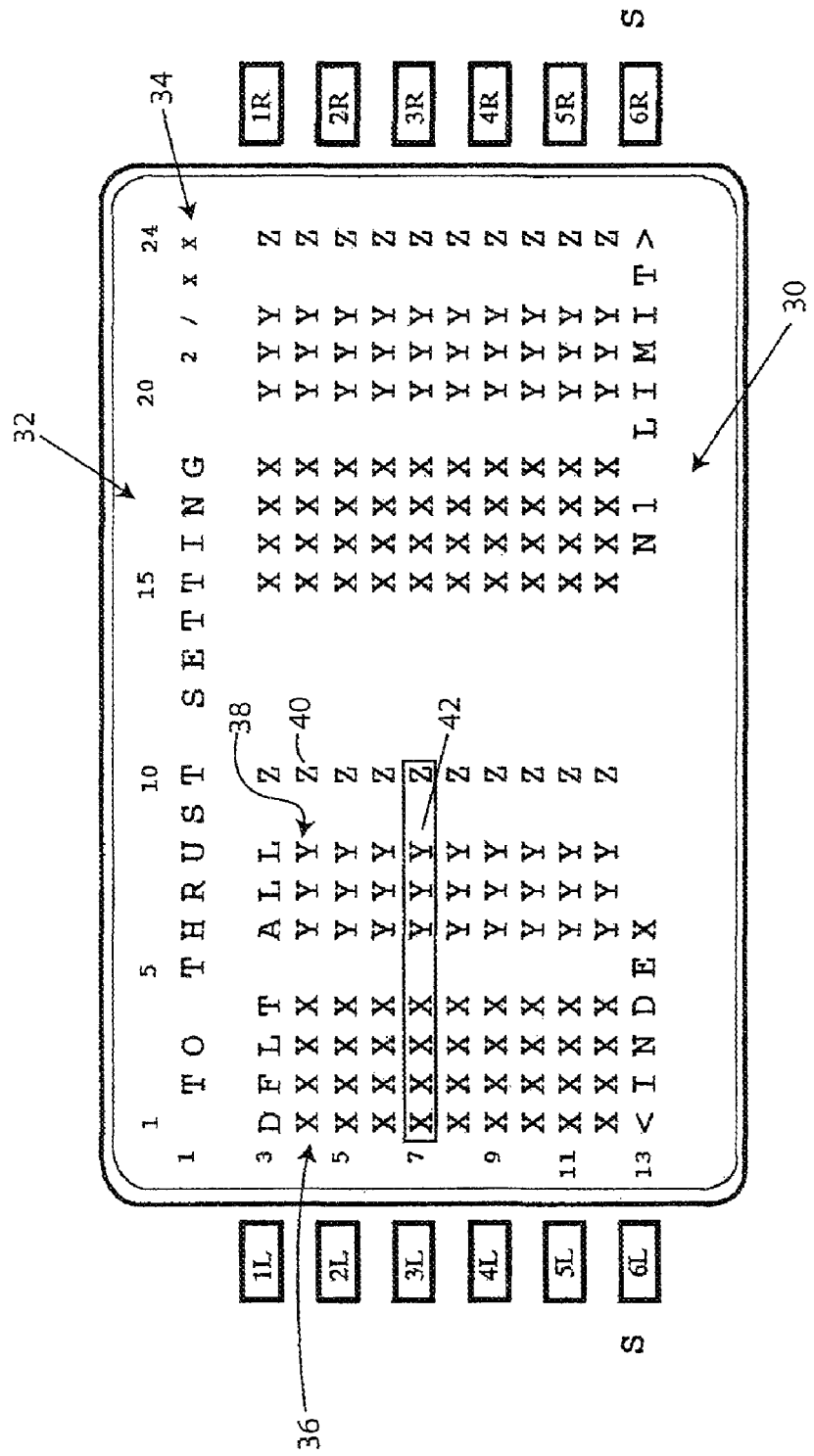
FIG. 3 is an exemplary illustration of a screen of the CDU that shows the information contained in an Airport/Runway lookup table of the present system and method that is used by a flight management computer (FMC) of the aircraft.

Referring to FIG. 3, a page display 30 on the CDU 20 is shown to illustrate one exemplary layout of a specific lookup table of the Airport/Runway lookup table database 18. It will be appreciated that the CDU 20 may be a commercially available component, available from Smiths Aerospace Limited of London, England, that is presently used on the flight decks of various commercial jet aircraft. Various other sources (e.g., Honeywell, Universal Avionics and Thales Group) may also offer suitable flight management control systems that may could potentially be used as the CDU 20. Thus, since the CDU 20 is a well known, commercially available component, only a limited explanation of its controls will be provided as they pertain to the implementation of the system 10. The CDU 20 display 30 includes 24 columns and 13 rows. For convenience, it may be assumed that the information shown on the display 30 is associated with aircraft configuration code "296", mentioned hereinbefore. The display 30 includes a specific title 32. A designation 34 is a variable that designates the total number of pages of take-off thrust setting data. Thus, the "XX" portion of designation 34 could represent 2, 3, 4 or any other number of pages of data.

The designation "XXXX" 36 may represent a specific airport code (e.g., KBFI for Boeing Field in Seattle, Wash.); designation "YYY" 38 may designate a specific runway (e.g., runway 31L at Boeing Field), and designation "Z" 40 may designate the take-off thrust to be used via a take-off thrust code ("0", "1", "2" or "B", with "B" indicating a bump thrust). Optionally but preferably, the take-off thrust code 40 selected by the FMC 14 (based on the aircraft configuration code of the aircraft 12) will be shaded or illuminated, as indicated by shading 42, to present the pilot and/or co-pilot with an immediate visual cue as to the take-off thrust code that the FMC 14 is selecting for use. It will be appreciated that while the Airport/Runway lookup table database 18 includes both airport and runway data, it could conceivably include only airport information.

The page display 30 in this example presents two complete sets of airport/runway/code, one of the left half of the CDU 20 display (i.e., columns 1-10) and the other set on the right half of the CDU 20 display (i.e., columns 15-24). Thus, if the airport/runway/code automatically selected is what appears in row 5, columns 1-10, then only columns 1-10 or row 5 will be highlighted or shaded. The designation "DFLT ALL" indicates a global default take-off thrust rating for an airport/runway entry that does not meet any of the airport and/or runway criteria in the data listing below it on the page display 30. For example, if "KGEG" (Spokane, Wash.) is entered into the FMC 14 flight plan, but KGEG is not contained in the airport/runway data of the Airport/Runway lookup table database 18, then the take-off thrust setting of BUMP will be used as a default thrust setting if "DFLT ALL B" is stored in the Airport/Runway lookup table database 18, as will be shown on line 3 of the display screen 30 in Figure. Line select keys (LSKs) "6L" through "6R" of the CDU 20 enable the pilot or co-pilot to jump to other screens on the CDU 20.

Figure 4:
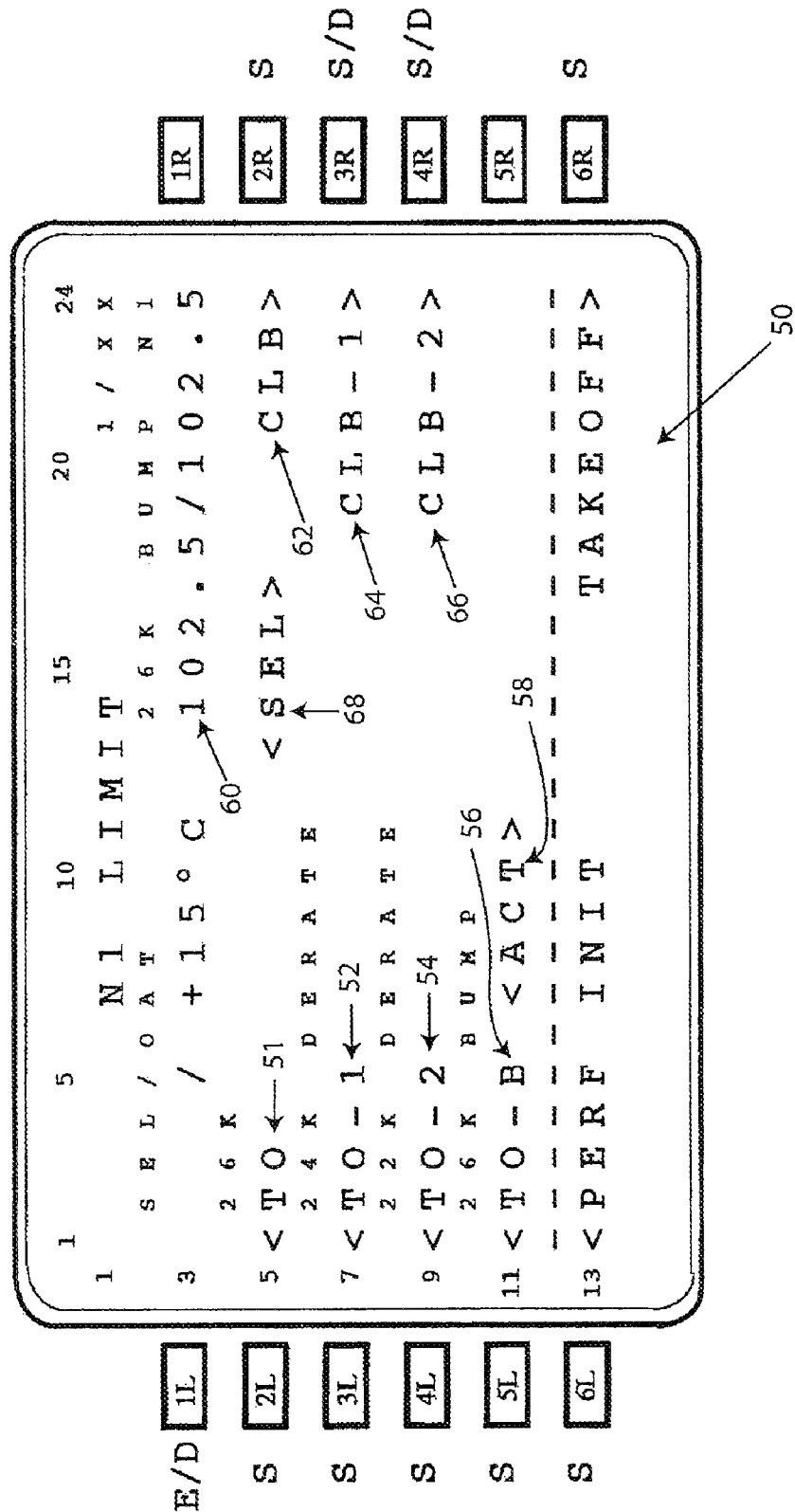
FIG. 4 is an exemplary illustration of a screen of the CDU showing the various take-off thrust settings available for use, and the specific thrust setting that has been selected by the present system and method.

Referring to FIG. 4, a different screen 50 (titled "N1 Limit") of the CDU 20 is illustrated. Screen 50 identifies the take-off thrust selections 51, 52, 54 and 56 that are available for the particular aircraft 12 that is being operated. The designation "<ACT>" 58 indicates that the "TO-B" (i.e., take-off bump thrust) is presently selected for use. The text "102.5/102.5" 60 indicates that the bump thrust is 102.5% of full thrust (full thrust being indicated as 27,000 lbs in row 4). The LSKs 2L-5L allow the pilot or co-pilot to manually override the selected take-off thrust. In this regard, LSKs 2L-5L can be viewed as corresponding to the manual take-off thrust override selection 22 in FIG. 1. The designations "CLB" 62, "CLB-1" 64 and "CLB-2" 66 indicate different thrust levels to be used during the climb phase of flight, with the "CLB" 62 thrust indicated as having been selected by the designator "<SEL>" 68. In this example LSKs 6L and 6R enable the pilot or co-pilot to jump to different screens of the CDU 20.

Figure 5:
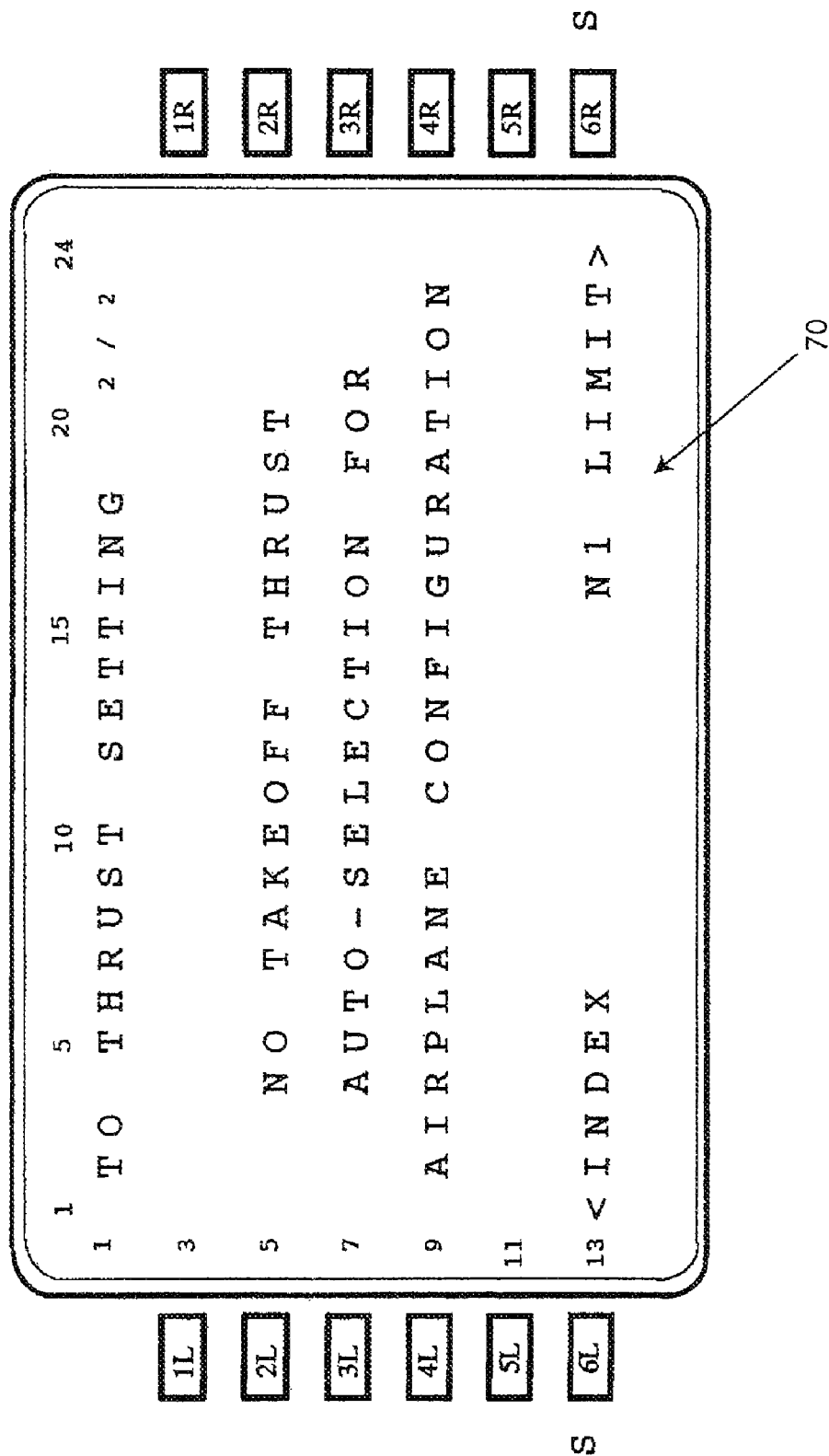
FIG. 5 is an exemplary illustration of a screen of the CDU that is displayed if the FMC has not been configured to implement the automatic thrust selection feature of the present system and method.

Referring briefly to FIG. 5, a screen 70 is illustrated that may be presented on the CDU 20 in the event that the aircraft configuration code being used by the FMC 14 is not supported in the Airport/Runway lookup table database 18. In this instance, an automatic selection of the take-off thrust is not possible and the pilot or co-pilot will need to manually select the take-off thrust setting to be used.

Figure 6:
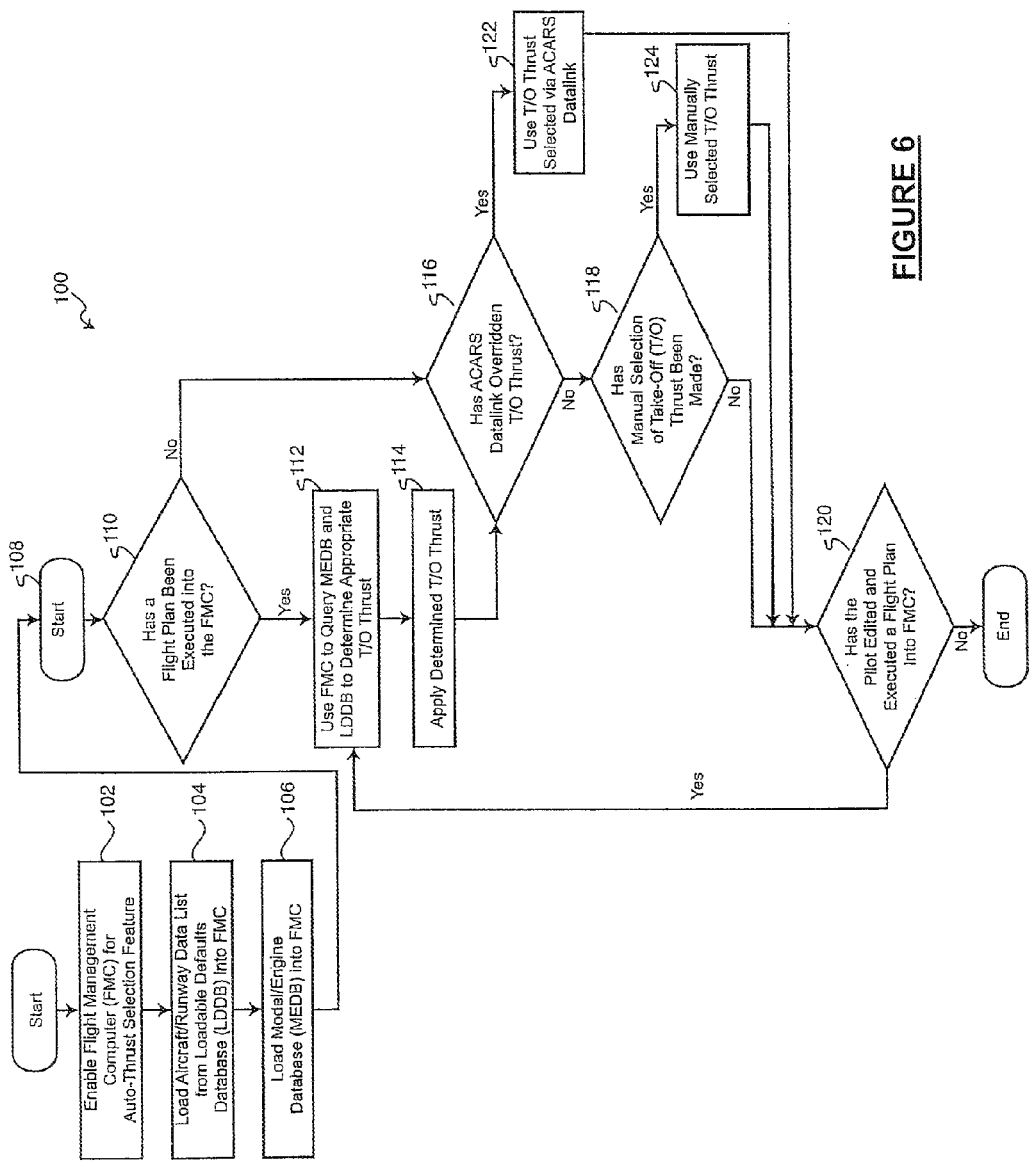
FIG. 6 is a flowchart illustrating various exemplary operations performed by a method of the present disclosure in selecting the take-off thrust for an aircraft.

Referring to FIG. 6, a flowchart 100 is illustrated showing various operations that correspond to one exemplary methodology of the present disclosure in making an automatic take-off thrust selection for a specific aircraft. At operation 102, the FMC 14 is initially enabled to use the auto-thrust selection feature. This may involve setting a control bit of the FMC 14 through the use of an external software program or tool. At operation 104 the Airport/Runway lookup table database 18 is loaded into the FMC 14. At operation 106 the MEDB 16 is loaded into the FMC 14. Cooperatively, operations 102, 104 and 106 may be viewed as "enabling" the FMC 14 to perform auto-thrust selection. Preferably, if any of the criteria set forth in operations 102, 104 or 106 is not met, then the automatic thrust selection feature is not enabled. It will be appreciated that in practice, however, that operations 102, 104 and 106 will typically only be performed on an occasional basis, for example when there is updated Airport/Runway lookup table database 18 software or updated software for the MEDB 16. Software loading into the FMC 14 may be performed by ground maintenance crew. It will also be appreciated that airport/runway data is not necessarily limited to being stored in the Airport/Runway lookup table database 18, and that the aircraft configuration information is not necessarily limited to being stored in the MEDB 16. Some of all of the data relating to databases 16 and 18 could be stored in other components accessible by the FMC 14.

At operation 108 a pilot begins the process of using the FMC 14. The pilot checks if a flight plan has been executed in the FMC 14, as indicated at operation 110. If the answer is "Yes", then the FMC 14 is used to query the MEDB 16 and the Airport/Runway lookup table database 18 to determine the appropriate take-off thrust, as indicated at operation 112. The determined take-off thrust is then applied, as indicated at operation 114. At operation 116, a check is made if the ACARS data link has overridden the automatic take-off thrust selection. If this inquiry produces a "No" answer, then a check is performed at operation 118 to see if manual selection of the take-off thrust has been made. If the check at operation 118 produces a "No" answer, then a check is made at operation 120 to determine if the pilot has edited and executed a flight plan into the FMC 14. If this inquiry results in a "No" answer, then the automatic selection of the take-off thrust is complete. If a "Yes" answer results, then a loop is made back to operation 112.

If the inquiry at operation 116 produces a "Yes" answer, indicating that the take-off thrust has been selected via the ACARS data link, then the take-off thrust selected via the ACARS data link is used, as indicated at operation 122. If the inquiry at operation 118 produces a "Yes" answer, indicating a manual selection of the take-off thrust has been made, then the manually selected take-off thrust is used, as indicated at operation 124. Operation 120 is repeated after either operation 122 or operation 124 is performed.

The system 10 and method of the present disclosure thus enables the FMC 14 to automatically select the correct take-off thrust to use for a particular aircraft operating a specific airport, and about to take off using a specific runway at the specified airport. The system 10 and method thus reduces the workload of the pilot and co-pilot in making the take-off thrust selection, while still providing the pilot and co-pilot the ability to override any particular take-off thrust selection that the FMC 14 selects. This may help to minimize pilot error of manual entries of a take-off thrust setting, for example if the thrust setting that the pilot was about to select is not in accordance with an airline's policy for a given airport origin and runway.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for automatically selecting a take-off thrust setting for an engine of a jet powered mobile platform, where the jet powered mobile platform includes a flight management computer that makes use of a configuration code, and where the configuration code is provided from a first set of information relating to operational parameters of the jet powered mobile platform, the method comprising:
   using a database, in communication with the flight management computer, to store information pertaining to different locations from which the jet powered mobile platform may perform a take-off operation;
   using the flight management computer to access the configuration code and the database to determine a take-off thrust setting that needs to be applied during the take-off operation at a specified one of said locations; and
   using said flight management computer to determine if an operator of said jet powered mobile platform has input a command to said flight management computer to override automatic selection of said take-off thrust setting.

2. The method of claim 1, wherein the configuration code represents a specific model of the jet powered mobile platform.

3. The method of claim 1, wherein the configuration code that takes into account a maximum thrust rating of said engine.

4. The method of claim 1, wherein the configuration code takes into account an engine thrust bump rating for the engine.

5. The method of claim 1, wherein the configuration code takes into account whether the engine is a single annular combustor engine or a dual annular combustor engine.

6. The method of claim 1, wherein the configuration code takes into account whether winglets are installed on the jet powered mobile platform.

7. The method of claim 1, wherein the configuration code takes into account which one of a plurality of different brake options are installed on the jet powered mobile platform.

8. The method of claim 1, wherein the configuration code takes into account whether the jet powered mobile platform includes no tailskid, a single position tailskid or a two position tailskid.

9. The method of claim 1, wherein using the database comprises initially generating the database by generating a list of at least one airport and at least one runway at the one airport.

10. The method of claim 1, wherein said initially generating the database includes generating a plurality of independent lookup tables, with each said lookup table including a particular airport with at least one runway useable by the jet powered mobile platform at the particular airport.

11. The method of claim 1, wherein the configuration code takes into account whether the take-off thrust setting represents a full take-off thrust, a first derate take-off thrust or a second derate take-off thrust.

12. The method of claim 1, further comprising using the flight management computer to determine if a subsystem located remotely from the jet powered mobile platform has provided a command to the flight management computer indicating that the take-off thrust is being selected by the remotely located subsystem.

13. A method for determining a take-off thrust for an engine of a jet powered aircraft, comprising:
   providing a first database including a plurality of aircraft configuration codes, with each said aircraft configuration code representing a plurality of operational parameters of the aircraft;
   storing the first database on a component of the aircraft;
   using a second database having a plurality of lookup tables, with each said lookup table being associated with at least one said aircraft configuration code and including a plurality of different runways from which the aircraft may perform a take-off operation, and a take-off thrust to be used at each said runway; and
   using a specific aircraft configuration code to retrieve a specific one of the lookup tables within the second database to obtain an engine take-off thrust setting to be used at a particular one of said runways during a take-off operation.

14. The method of claim 13, wherein each said lookup table further includes information concerning a take-off thrust setting to be used at a specific runway of a specific airport.

15. The method of claim 13, further comprising:
   using a flight management computer of the aircraft to obtain the aircraft configuration code from the first database; and
   causing the flight management computer to use the aircraft configuration code to retrieve a particular one of the lookup tables of the second database.

16. The method of claim 13, further comprising determining if a subsystem located remotely from the aircraft is supplying a wireless command to the aircraft to control selection of the engine thrust setting.

17. The method of claim 13, further comprising enabling an operator of said aircraft to manually select a take-off engine thrust setting.

18. A system for automatically selecting a take-off thrust for an engine of a jet powered aircraft, where the aircraft has a flight management computer and a memory in communication with the flight management computer, the system comprising:
   an airport/runway look-up table database stored in the memory, the look-up table database including a plurality of lookup tables, each said lookup table being associated with at least one aircraft configuration code, with each said aircraft configuration code representing a specific collection of operational parameters of a specific aircraft; and
   each said lookup table including a take-off thrust code representing a specific engine thrust setting to be used for a take-off operation at a specific runway; and
   the flight management computer adapted to use the aircraft configuration code to select the look-up table, to obtain a specific engine take-off thrust setting to be used in a take-off procedure when the aircraft takes off from the specific runway.

19. The system of claim 18, wherein the lookup table comprises information including a plurality of different runways at a specific airport.

20. A method for determining a take-off thrust setting for an engine of a jet powered aircraft, comprising:
   storing a plurality of aircraft configuration codes, with each said aircraft configuration code representing a plurality of operational parameters of the aircraft;
   storing a plurality of lookup tables, with each said lookup table being associated with at least one said aircraft configuration code and including a plurality of different runways from which the aircraft may perform a take-off operation, and a take-off thrust setting to be used at each said runway;
   selecting a specific aircraft configuration code to retrieve a specific one of the lookup tables to obtain an engine take-off thrust setting to be used at a particular one of the runways during a take-off operation; and
   using an aircraft communication and reporting subsystem (ACARS) remote from the jet powered aircraft to wirelessly provide the engine take-off thrust setting to the jet powered aircraft.

21. A system for determining a take-off thrust setting for an engine of a jet powered aircraft, comprising:
   a plurality of aircraft configuration codes, with each said aircraft configuration code representing a plurality of operational parameters of the aircraft;
   a plurality of lookup tables, with each said lookup table being associated with at least one said aircraft configuration code and including a plurality of different runways from which the aircraft may perform a take-off operation, and a take-off thrust setting to be used at each said runway; and
   an aircraft communication and reporting subsystem (ACARS) for wirelessly providing a selected take-off thrust setting obtained from a selected one of the lookup tables to the jet powered aircraft.

* * * * *